US011742506B2

United States Patent
Lee

(10) Patent No.: US 11,742,506 B2
(45) Date of Patent: Aug. 29, 2023

(54) METHOD OF MANUFACTURING MEMBRANE-ELECTRODE ASSEMBLY CAPABLE OF REDUCING CONSUMPTION OF ELECTROLYTE MEMBRANE

(71) Applicants: HYUNDAI MOTOR COMPANY, Seoul (KR); KIA MOTORS CORPORATION, Seoul (KR)

(72) Inventor: Ki Sub Lee, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 583 days.

(21) Appl. No.: 17/026,491

(22) Filed: Sep. 21, 2020

(65) Prior Publication Data
US 2021/0135263 A1 May 6, 2021

(30) Foreign Application Priority Data
Oct. 30, 2019 (KR) .................... 10-2019-0136187

(51) Int. Cl.
*H01M 8/1004* (2016.01)
(52) U.S. Cl.
CPC .................. *H01M 8/1004* (2013.01)

(58) Field of Classification Search
CPC ............ H01M 8/1004; H01M 4/8875; H01M 8/0286; H01M 8/0273; Y02E 60/50; Y02P 70/50; Y10T 29/49128; Y10T 29/49147
See application file for complete search history.

(56) References Cited

U.S. PATENT DOCUMENTS

| | | | |
|---|---|---|---|
| 8,288,059 B2 * | 10/2012 | Pierpont ............. | H01M 8/0284 429/479 |
| 10,038,178 B2 * | 7/2018 | Le Gal ................... | H01G 11/84 |
| 10,862,139 B2 * | 12/2020 | Kim ....................... | H01M 8/106 |

FOREIGN PATENT DOCUMENTS

KR  2018-0071618 A  6/2018

* cited by examiner

*Primary Examiner* — Donghai D Nguyen
(74) *Attorney, Agent, or Firm* — MCDONNELL BOEHNEN HULBERT & BERGHOFF LLP

(57) ABSTRACT

The present disclosure relates to a method of manufacturing a membrane-electrode assembly capable of reducing consumption of an electrolyte membrane. Specifically, in the present disclosure, a polymer film replaces a non-reaction portion of a conventional electrolyte membrane, so it is possible to prevent waste of a high-priced electrolyte membrane. Consequently, production of membrane-electrode assemblies is improved.

14 Claims, 7 Drawing Sheets a-a' section b-b' section

METHOD OF MANUFACTURING MEMBRANE-ELECTRODE ASSEMBLY CAPABLE OF REDUCING CONSUMPTION OF ELECTROLYTE MEMBRANE

CROSS REFERENCE TO RELATED APPLICATIONS

This application claims, under 35 U.S.C. § 119(a), the benefit of priority to Korean Patent Application No. 10-2019-0136187 filed on Oct. 30, 2019, the entire contents of which are incorporated herein by reference.

BACKGROUND

(a) Technical Field

The present disclosure relates to a method of manufacturing a membrane-electrode assembly capable of reducing consumption of an electrolyte membrane.

(b) Background Art

In general, a membrane-electrode assembly (MEA), which is a main component of a fuel cell stack, configured such that a pair of electrodes including catalysts is coupled to opposite surfaces of an electrolyte membrane, is called a three-layered membrane-electrode assembly.

On the other hand, a membrane-electrode assembly including a sub-gasket having electrode windows, the area of which is equal to or slightly smaller than the area of electrodes, at the edge of each of the opposite surfaces thereof in order to easily handle the membrane-electrode assembly, and to secure physical durability of the membrane-electrode assembly, is called a five-layered membrane-electrode assembly.

FIG. 1 is a sectional view schematically showing a conventional five-layered membrane-electrode assembly. Referring to this figure, the membrane-electrode assembly includes an electrolyte membrane 91, a pair of electrodes 92 formed on opposite surfaces of the electrolyte membrane 91, and sub-gaskets 93 joined to the electrolyte membrane 91 near the electrodes 92.

The electrolyte membrane 91 is divided into a reaction portion 91a abutting the electrodes 92 and a non-reaction portion 91b abutting the sub-gaskets 93. The non-reaction portion 91b is a portion that does not participate in electrode reaction, i.e., oxidation and reduction. That is, the non-reaction portion 91b is a substantially wasteful portion.

The electrolyte membrane 91 is a high-priced product, and therefore the non-reaction portion 91b may cause an increase in price of a membrane-electrode assembly.

The above information disclosed in this Background section is provided only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with the prior art.

It is an object of the present disclosure to provide a method of manufacturing a membrane-electrode assembly capable of minimizing waste of an electrolyte membrane, thereby securing economy in production of products.

It is another object of the present disclosure to provide a method of manufacturing a membrane-electrode assembly capable of improving productivity, thereby further improving price competitiveness of products.

The objects of the present disclosure are not limited to those described above. The objects of the present disclosure will be clearly understood from the following description and could be implemented by means defined in the claims and a combination thereof.

In one aspect, the present disclosure provides a method of manufacturing a membrane-electrode assembly, the method including preparing an electrolyte sheet having a predetermined length and a predetermined width, forming electrode groups on the electrolyte sheet in a plurality of rows in a lateral direction thereof, each of the electrode groups being configured such that a plurality of electrodes is disposed spaced apart from each other by a predetermined distance in a longitudinal direction of the electrolyte sheet, cutting the electrolyte sheet between the electrode groups to obtain a plurality of stacks located in different planes, and joining sub-gaskets to opposite surfaces of each stack.

The electrode groups may be formed on opposite surfaces of the electrolyte sheet.

The electrode groups may be formed such that the ratio (B/A) of the distance (B) between the electrode groups formed in the rows to the width (A) of each electrode may be 0.1 to 0.5.

The stacks may be separated from each other such that each of the stacks is located in a different plane from stacks adjacent thereto.

The stacks obtained by cutting the electrolyte sheet between the electrode groups may be moved at different angles relative to the electrolyte sheet such that the stacks are separated from each other so as to be located in different planes parallel to a plane in which the electrolyte sheet is present.

The stacks may include a first stack including (2n−1)-row electrode groups (n being an integer of 1 or more) and a second stack including 2n-row electrode groups (n being an integer of 1 or more).

The stacks may include a first stack including (3m+1)-row electrode groups (m being an integer of 0 or more), a second stack including (3m+2)-row electrode groups (m being an integer of 0 or more), and a third stack including (3m+3)-row electrode groups (m being an integer of 0 or more).

The stacks may include a first stack including (4x+1)-row electrode groups (x being an integer of 0 or more), a second stack including (4x+2)-row electrode groups (x being an integer of 0 or more), a third stack including (4x+3)-row electrode groups (x being an integer of 0 or more), and a fourth stack including (4x+4)-row electrode groups (x being an integer of 0 or more).

Each stack may include each row electrode group and an electrolyte membrane to which each row electrode group is attached, and the electrolyte membranes may be spaced apart from each other by a predetermined distance.

The width of each electrolyte membrane may be larger than the width of the electrode group.

Each sub-gasket may include electrode windows formed therethrough at positions corresponding to the electrode groups so as to receive the electrode groups, and at least one of the sub-gaskets joined to the opposite surfaces of each stack may include a polymer film located in a space between the electrode windows, formed so as to have a smaller width than the space, formed so as to have a width equivalent to the distance between adjacent electrolyte membranes, and having a predetermined thickness.

The polymer film may have a thickness equivalent to the thickness of each electrolyte membrane.

The polymer film and each electrolyte membrane may form a single plane when the sub-gaskets are joined to the opposite surfaces of each stack.

The method may further include cutting a membrane-electrode assembly obtained by joining the sub-gaskets between the electrolyte membranes, wherein the sub-gaskets and the polymer film may be cut.

BRIEF DESCRIPTION OF THE FIGURES

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
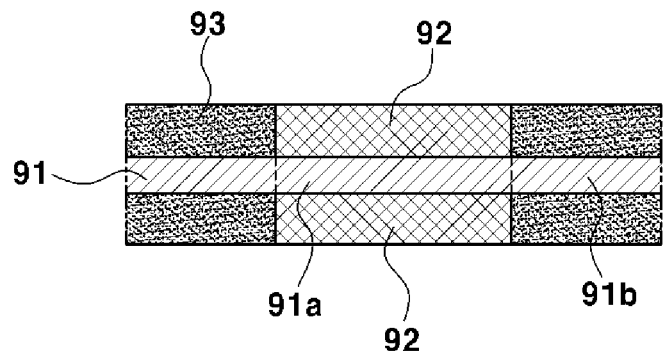
FIG. 1 is a sectional view schematically showing a conventional five-layered membrane-electrode assembly.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

The objects described above, and other objects, features and advantages will be clearly understood from the following preferred embodiments with reference to the attached drawings. However, the present disclosure is not limited to the embodiments and will be embodied in different forms. The embodiments are suggested only to offer thorough and complete understanding of the disclosed contents and sufficiently inform those skilled in the art of the technical concept of the present disclosure.

Like reference numbers refer to like elements throughout the description of the figures. In the drawings, the sizes of structures are exaggerated for clarity. It will be understood that, although the terms "first", "second", etc. may be used herein to describe various elements, corresponding elements should not be understood to be limited by these terms, which are used only to distinguish one element from another. For example, within the scope defined by the present disclosure, a first element may be referred to as a second element and similarly, a second element may be referred to as a first element. Singular forms are intended to include plural forms as well, unless the context clearly indicates otherwise.

It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element or an intervening element may also be present. It will also be understood that, when an element such as a layer, film, region or substrate is referred to as being "under" another element, it can be directly under the other element or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures among other things. For this reason, it should be understood that, in all cases, the term "about" should modify all numbers, figures and/or expressions. In addition, when numeric ranges are disclosed in the description, these ranges are continuous and include all numbers from the minimum to the maximum including the maximum within the range unless otherwise defined. Furthermore, when the range refers to an integer, it includes all integers from the minimum to the maximum including the maximum within the range, unless otherwise defined.

A method of manufacturing a membrane-electrode assembly according to the present disclosure may be performed by preparing an electrolyte sheet having a predetermined length and a predetermined width, forming electrode groups on the electrolyte sheet in a plurality of rows in a lateral direction thereof, cutting the electrolyte sheet between the electrode groups to obtain a plurality of stacks located in different planes, and joining sub-gaskets to opposite surfaces of each stack.

The steps of the method of manufacturing the membrane-electrode assembly according to the present disclosure may be successively performed and are not particularly restricted. For example, electrode groups may be transferred to opposite surfaces of an electrolyte sheet while the electrolyte sheet is continuously supplied in a roll-to-roll manner, the electrolyte sheet between the electrode groups may be cut, stacks may be spatially separated from each other, and sub-gaskets may be joined to each stack.

Figure 2:
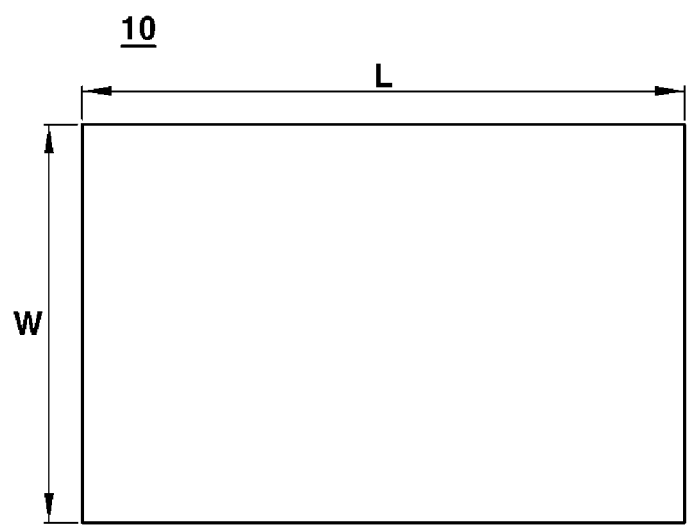
FIG. 2 is a plan view showing an electrolyte sheet according to the present disclosure.

FIG. 2 is a plan view showing an electrolyte sheet 10. Referring to this figure, the electrolyte sheet 10 may be formed so as to have a predetermined length L and a predetermined width W. The length L, the width W, and the thickness of the electrolyte sheet are not particularly restricted, and may be appropriately adjusted according to the purpose of use thereof.

The electrolyte sheet 10 may include a perfluorosulfonic acid ionomer, such as Nafion.

Figure 3:
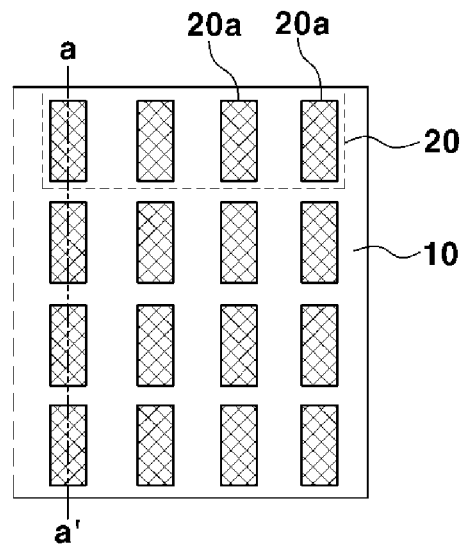
FIG. 3 is a plan view showing a structure in which electrode groups are formed on the electrolyte sheet.

FIG. 3 is a plan view showing a structure in which electrode groups 20 are formed on the electrolyte sheet 10. Referring to this figure, each of the electrode groups 20 may be configured such that a plurality of electrodes 20a is disposed spaced apart from each other by a predetermined distance in a longitudinal direction of the electrolyte sheet 10.

According to the present disclosure, the electrode groups 20 are formed on the electrolyte sheet 10 in a plurality of rows in a lateral direction thereof, whereby it is possible to obtain a plurality of membrane-electrode assemblies. Consequently, productivity of the membrane-electrode assemblies is greatly improved.

Figure 4:
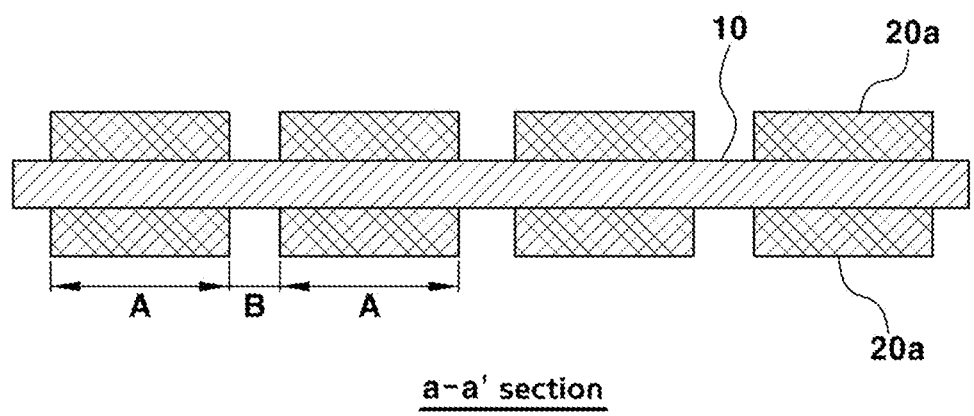
FIG. 4 is a sectional view taken along line a-a' of FIG. 3.

FIG. 4 is a sectional view taken along line a-a' of FIG. 3. Referring to this figure, the electrodes 20a may be formed on opposite surfaces of the electrolyte sheet 10.

The ratio (B/A) of the distance B between the electrode groups 20 formed in the rows to the width A of each electrode 20a may be 0.1 to 0.5. If the ratio is less than 0.1, the distance between the electrode groups 20 is too small, whereby it is possible to cut the electrolyte sheet. If the ratio exceeds 0.5, the effect of reducing consumption of the electrolyte sheet 10 may be slight.

The thickness of each electrode 20a is not particularly restricted, and may be appropriately adjusted according to the purpose of use thereof.

Figure 5:
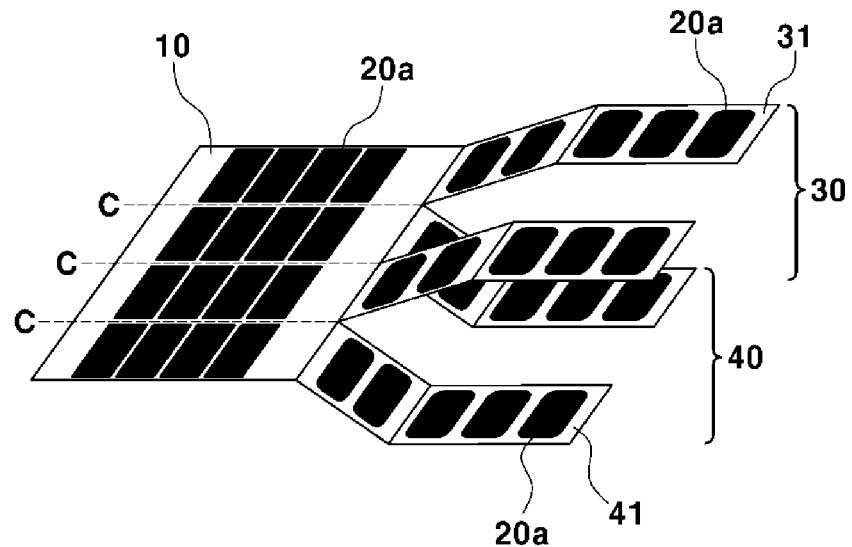
FIG. 5 is a reference view illustrating that a first stack and a second stack are obtained by cutting the electrolyte sheet between the electrode groups.

Subsequently, as shown in FIG. 5, the electrolyte sheet between the electrode groups 20 may be cut to separate a plurality of stacks from each other such that each of the stacks is located in a different plane from stacks adjacent thereto. FIG. 5 shows the case in which the stacks include a first stack 30 including (2n−1)-row electrode groups (n being an integer of 1 or more) and a second stack 40 including 2n-row electrode groups (n being an integer of 1 or more).

Here, the "(2n−1)-row electrode groups" mean (2n−1)-th electrode groups from one side of the electrolyte sheet 10 in the lateral direction thereof, and the "2n-row electrode groups" mean 2n-th electrode groups under the same conditions.

For example, the (2n−1)-row electrode groups mean first, third, fifth, . . . electrode groups from one side of the electrolyte sheet 10 in the lateral direction thereof, and the 2n-row electrode groups mean second, fourth, sixth, . . . electrode groups from the same side of the electrolyte sheet 10.

However, the present disclosure is not limited thereto. The stacks may include a first stack including (3m+1)-row electrode groups (m being an integer of 0 or more), a second stack including (3m+2)-row electrode groups (m being an integer of 0 or more), and a third stack including (3m+3)-row electrode groups (m being an integer of 0 or more).

In addition, the stacks may include a first stack including (4x+1)-row electrode groups (x being an integer of 0 or more), a second stack including (4x+2)-row electrode groups (x being an integer of 0 or more), a third stack including (4x+3)-row electrode groups (x being an integer of 0 or more), and a fourth stack including (4x+4)-row electrode groups (x being an integer of 0 or more).

In addition, the stacks may be separated from each other randomly, rather than in progression of differences, such that each of the stacks is located in a different plane from stacks adjacent thereto.

In the following description, however, the case in which the stacks according to the present disclosure are arranged as shown in FIG. 5 will be assumed for convenience of description.

After the electrolyte sheet between the electrode groups is cut, the first stack 30 and the second stack 40 may be separated from each other so as to be located in different planes. Here, "located in different planes" means that the two stacks 30 and 40 are spatially separated from each other so as not to overlap each other. Referring to FIG. 5, however, ends of the two stacks 30 and 40 are not cut and thus are attached to each other. For this reason, the stacks are not moved to spaces far from each other but may be separated from each other upwards and downwards. Specifically, as shown in FIG. 5, the first stack 30 may be moved upwards, and the second stack 40 may be moved downwards. However, the present disclosure is not limited thereto. Only one of the stacks may be moved such that the first stack 30 and the second stack 40 are located in different planes.

Figure 6A:
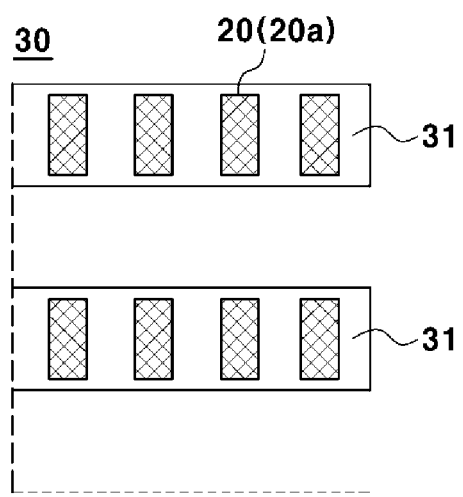
FIG. 6A is a plan view showing the first stack.
Figure 6B:
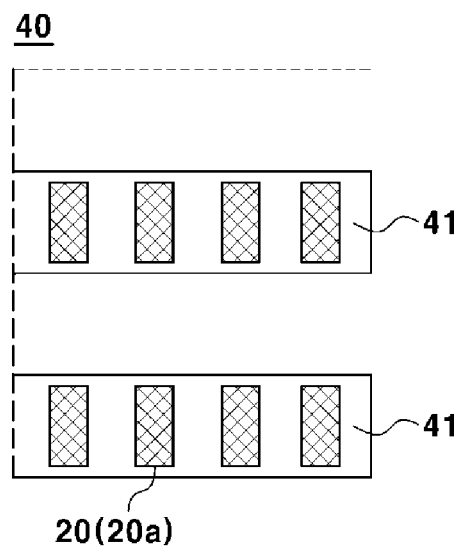
FIG. 6B is a plan view showing the second stack.

FIG. 6A is a plan view showing the first stack 30, and FIG. 6B is a plan view showing the second stack 40.

Referring to FIG. 6A, the first stack 30 may include electrode groups 20 and an electrolyte membrane 31 to which each row electrode group 20 is attached. The width of the electrolyte membrane 31 may be greater than the width of each electrode group 20, specifically each electrode 20a.

Each electrolyte membrane 31 may be spatially spaced apart from electrolyte membranes 31 adjacent thereto. A polymer film attached to a sub-gasket, a description of which will follow, may be inserted into a gap between the electrolyte membranes. Consequently, a non-reaction portion of the electrolyte membrane 31 that does not abut the electrodes 20a is much smaller than in the conventional art, whereby it is possible to secure economy in production of membrane-electrode assemblies. The same is equally applied to the second stack 40, a description of which will follow.

Referring to FIG. 6B, the second stack 40 may include electrode groups 20 and an electrolyte membrane 41 to which each row electrode group 20 is attached. The width of the electrolyte membrane 41 may be larger than the width of each electrode group 20, specifically each electrode 20a.

Sub-gaskets may be joined to opposite surfaces of the first stack 30 to obtain a membrane-electrode assembly.

Figure 7:
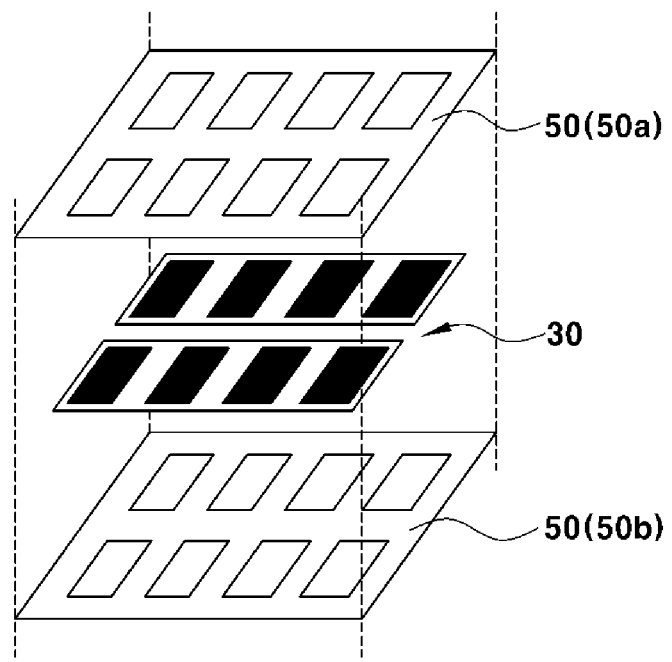
FIG. 7 is a reference view illustrating that sub-gaskets are joined to the first stack.

FIG. 7 is a reference view illustrating that sub-gaskets are joined to the first stack 30. Referring to this figure, an upper sub-gasket 50a and a lower sub-gasket 50b may be joined to opposite surfaces of the first stack 30 so as to be stacked.

Figure 8:
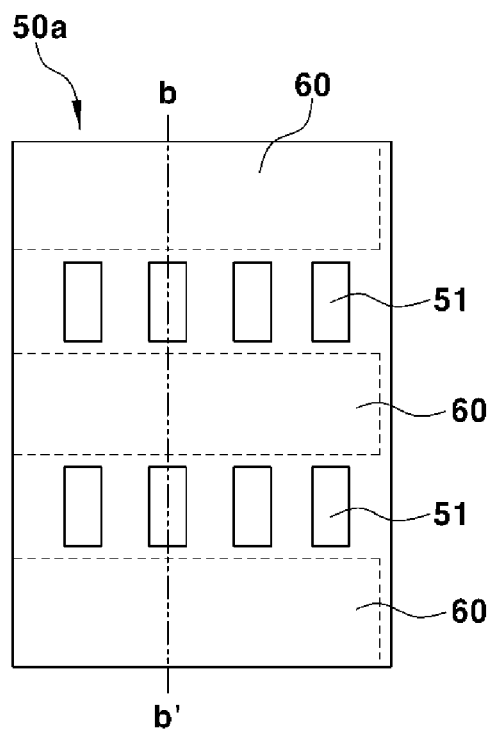
FIG. 8 is a plan view showing an upper sub-gasket according to the present disclosure.

FIG. 8 is a plan view showing the upper sub-gasket 50a. Referring to this figure, the upper sub-gasket 50a may include electrode windows 51 formed therethrough at positions corresponding to the electrode groups 20 so as to receive the electrode groups 20.

Figure 9:
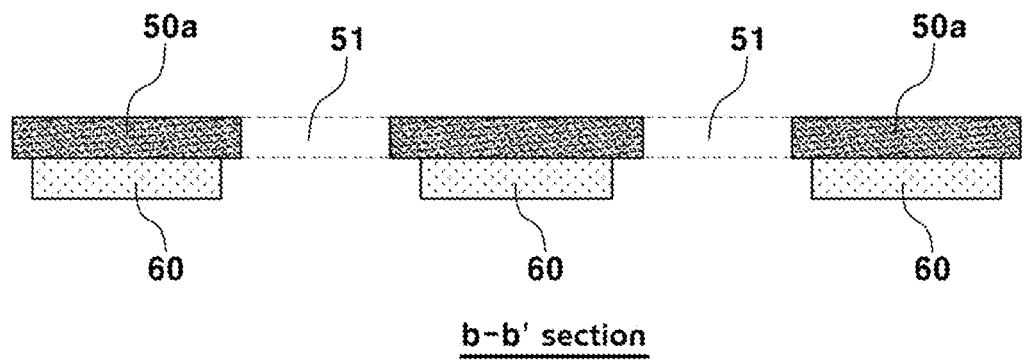
FIG. 9 is a sectional view taken along line b-b' of FIG. 8.

FIG. 9 is a sectional view taken along line b-b' of FIG. 8. Referring to this figure, the upper sub-gasket 50a may further include a polymer film 60, which is located in a space between the electrode windows 51, is formed so as to have a smaller width than the space, is formed so as to have a width equivalent to the distance between adjacent electrolyte membranes 31 of the first stack 30, and has a predetermined thickness. For reference, in FIG. 8, the polymer film 60 is shown in a dotted line, since the polymer film is located on the bottom surface of the upper sub-gasket 50a.

The width of the polymer film 60 must be equal to the distance between adjacent electrolyte membranes 31 of the first stack 30 such that the polymer film 60 is located between the electrolyte membranes 31 in the same plane when the sub-gaskets 50 are coupled to the first stack 30, as will be described below.

The thickness of the polymer film 60 is not particularly restricted. Preferably, the polymer film is formed so as to have a thickness equal to or twice or less of the thickness of the electrolyte membrane 31. If the thickness of the polymer film 60 is smaller than the thickness of the electrolyte membrane 31 or exceeds two times the thickness of the electrolyte membrane 31, a step may be formed, whereby it may be difficult to maintain airtightness.

The polymer film 60 may include one selected from the group consisting of polyurethane, epoxy resin, polyvinyl acetate, polyethylene terephthalate, polyethylene, and a combination thereof.

The polymer film 60 may be provided in a film form such that, when the polymer film 60 is attached to the bottom surface of the upper sub-gasket 50a using an adhesive or when the upper sub-gasket 50a is joined to the first stack 30, the polymer film 60 is arranged at an appropriate position therebetween.

Figure 10:
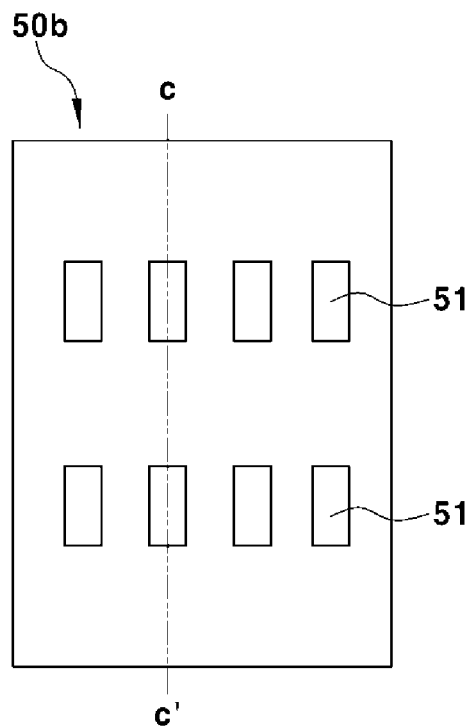
FIG. 10 is a plan view showing a lower sub-gasket according to the present disclosure.
Figure 11:
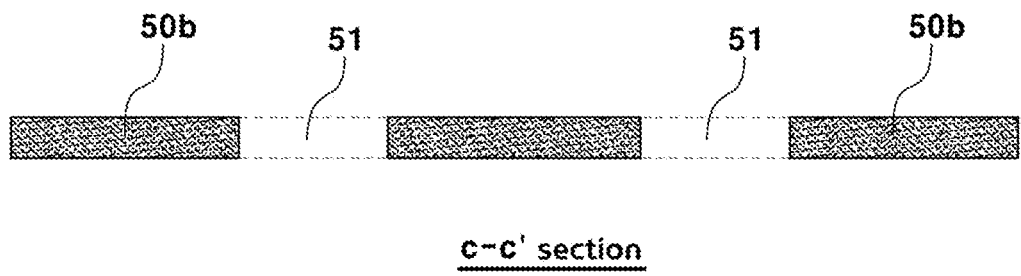
FIG. 11 is a sectional view taken along line c-c' of FIG. 10.

FIG. 10 is a plan view showing the lower sub-gasket 50b, and FIG. 11 is a sectional view taken along line c-c' of FIG. 10. Referring to these figures, the lower sub-gasket 50b may include electrode windows 51 formed therethrough at positions corresponding to the electrode groups 20 so as to receive the electrode groups 20.

The sub-gaskets 50 including the polymer film 60 have been described with reference to FIGS. 8 to 11. However, the present disclosure is not limited thereto. The polymer film 60 may be formed so as to have an appropriate thickness such that the polymer film can be applied to both the upper sub-gasket 50a and the lower sub-gasket 50b.

Figure 12:
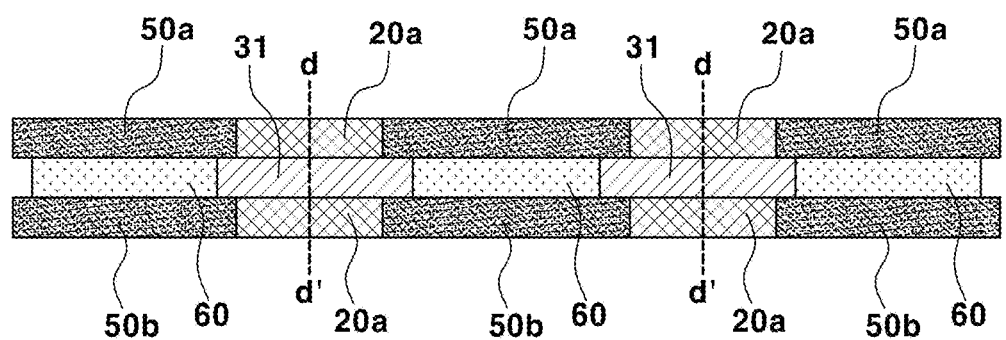
FIG. 12 is a sectional view showing a membrane-electrode assembly configured such that sub-gaskets are joined to opposite surfaces of a first stack.

FIG. 12 is a sectional view showing a membrane-electrode assembly configured such that sub-gaskets 50 are joined to opposite surfaces of a first stack 30, in the same manner as in FIG. 7. Referring to this figure, it can be seen that electrodes 20a are inserted into electrode windows of the sub-gaskets 50a and 50b. In addition, it can be seen that a polymer film 60 is inserted into a space between electrolyte membranes 31 such that the electrolyte membranes 31 and the polymer film 60 form the same plane.

Subsequently, the membrane-electrode assembly between the electrolyte membranes 31 may be cut (d-d') to obtain a membrane-electrode assembly including each row electrode groups 20. At this time, the sub-gaskets 50a and 50b and the polymer film 60 may also be cut (d-d').

Sub-gaskets 50 may be joined to opposite surface of the second stack 50 of FIG. 6B in the same manner as the first stack 30. The details thereof are substantially identical to those of the first stack 30, and therefore, a description thereof will be omitted.

In the method of manufacturing the membrane-electrode assembly according to the present disclosure, the polymer film replaces the non-reaction portion of the conventional electrolyte membrane, whereby it is possible to prevent waste of the high-priced electrolyte membrane. Consequently, it is possible to greatly improve economy in production of membrane-electrode assemblies.

Also, in the method of manufacturing the membrane-electrode assembly according to the present disclosure, the electrode groups are formed on the electrolyte sheet in a plurality of rows, whereby it is possible to simultaneously manufacture a plurality of membrane-electrode assemblies. Consequently, it is possible to improve price competitiveness of the membrane-electrode assemblies.

As is apparent from the foregoing, according to the present disclosure, it is possible to minimize anon-reaction portion of an electrolyte membrane, whereby it is possible to secure economy in production of products.

In addition, according to the present disclosure, it is possible to simultaneously manufacture a plurality of membrane-electrode assemblies, whereby it is possible to greatly improve price competitiveness of products.

The effects of the present disclosure are not limited to those mentioned above. It should be understood that the effects of the present disclosure include all effects that can be inferred from the foregoing description of the present disclosure.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

The invention claimed is:

1. A method of manufacturing a membrane-electrode assembly, the method comprising:
   preparing an electrolyte sheet having a predetermined length and a predetermined width;
   forming electrode groups on the electrolyte sheet in a plurality of rows in a lateral direction, each of the electrode groups being configured such that a plurality of electrodes is disposed spaced apart from each other by a predetermined distance in a longitudinal direction of the electrolyte sheet;
   cutting the electrolyte sheet between the electrode groups to obtain a plurality of stacks located in different planes; and
   joining sub-gaskets to opposite surfaces of each of the plurality of stacks.

2. The method according to claim 1, wherein the electrode groups are formed on opposite surfaces of the electrolyte sheet.

3. The method according to claim 1, wherein the electrode groups are formed such that a ratio (B/A) of a distance (B) between the electrode groups formed in the plurality of rows to a width (A) of each electrode is 0.1 to 0.5.

4. The method according to claim 1, wherein the plurality of stacks are separated from each other such that each of the plurality of stacks is located in a different plane from an adjacent stack.

5. The method according to claim 4, wherein the plurality of stacks obtained by cutting the electrolyte sheet between the electrode groups are moved at different angles relative to the electrolyte sheet, such that the plurality of stacks are separated from each other so as to be located in different planes parallel to a plane in which the electrolyte sheet lies.

6. The method according to claim 1, wherein the plurality of stacks comprises a first stack comprising (2n−1)-row electrode groups (n being an integer of 1 or more) and a second stack comprising 2n-row electrode groups (n being an integer of 1 or more).

7. The method according to claim 1, wherein the plurality of stacks comprises a first stack comprising (3m+1)-row electrode groups (m being an integer of 0 or more), a second stack comprising (3m+2)-row electrode groups (m being an integer of 0 or more), and a third stack comprising (3m+3)-row electrode groups (m being an integer of 0 or more).

8. The method according to claim 1, wherein the plurality of stacks comprises a first stack comprising (4x+1)-row electrode groups (x being an integer of 0 or more), a second stack comprising (4x+2)-row electrode groups (x being an integer of 0 or more), a third stack comprising (4x+3)-row electrode groups (x being an integer of 0 or more), and a fourth stack comprising (4x+4)-row electrode groups (x being an integer of 0 or more).

9. The method according to claim 1, wherein:
each stack comprises each row electrode group and an electrolyte membrane to which each row electrode group is attached; and
the electrolyte membranes are spaced apart from each other by a predetermined distance.

10. The method according to claim 9, wherein a width of each electrolyte membrane is larger than a width of the electrode group.

11. The method according to claim 9, wherein:
each sub-gasket comprises electrode windows formed therethrough at positions corresponding to the electrode groups so as to receive the electrode groups; and
at least one of the sub-gaskets joined to the opposite surfaces of each stack comprises a polymer film located in a space between the electrode windows, formed so as to have a smaller width than the space, formed so as to have a width equivalent to a distance between adjacent electrolyte membranes, and having a predetermined thickness.

12. The method according to claim 11, wherein the polymer film has a thickness equivalent to a thickness of each electrolyte membrane.

13. The method according to claim 11, wherein the polymer film and each electrolyte membrane form a single plane when the sub-gaskets are joined to the opposite surfaces of each stack.

14. The method according to claim 11, further comprising cutting a membrane-electrode assembly obtained by joining the sub-gaskets between the electrolyte membranes, wherein the sub-gaskets and the polymer film are cut.

* * * * *